United States Patent [19]

Eckley

[11] 4,217,767

[45] Aug. 19, 1980

[54] APPARATUS FOR HOUSING A SHAFT COUPLING

[75] Inventor: Kenneth E. Eckley, Syracuse, N.Y.

[73] Assignee: Carrier Corporation, Syracuse, N.Y.

[21] Appl. No.: 954,043

[22] Filed: Oct. 23, 1978

[51] Int. Cl.² ............................................. F16D 3/84
[52] U.S. Cl. ......................................... 64/32 R; 64/3
[58] Field of Search ................... 64/32 R, 32 F, 3; 74/608, 609

[56] References Cited

U.S. PATENT DOCUMENTS

| | | | |
|---|---|---|---|
| 2,696,089 | 12/1954 | Heth | 64/32 R |
| 2,971,399 | 2/1961 | Roberts | 74/609 |
| 3,284,121 | 11/1966 | Lyon | 64/3 |
| 3,543,536 | 12/1970 | Rekow | 64/32 R |
| 3,805,553 | 4/1974 | Yehl | 64/32 R |
| 4,130,998 | 12/1978 | Einsel | 64/3 |

Primary Examiner—Ira S. Lazarus
Attorney, Agent, or Firm—J. Raymond Curtin; John S. Sensny

[57] ABSTRACT

Apparatus for housing a shaft coupling, comprising an outside axially extending sleeve for connection to a first shaft casing, and for partially covering a pair of generally aligned shafts and a shaft coupling connecting the shafts; and an inside axially extending sleeve for connection to a second shaft casing, and for further covering the shafts and the shaft coupling, wherein the inside sleeve is radially spaced from the outside sleeve and is axially slidable into the interior of the outside sleeve to produce an annular opening for access to the shafts and shaft coupling. The apparatus further comprises radial sealing means for sealing the space between the inside and outside sleeves.

3 Claims, 5 Drawing Figures

APPARATUS FOR HOUSING A SHAFT COUPLING

BACKGROUND OF THE INVENTION

This invention relates generally to shaft couplings, and more particularly to apparatus for housing a shaft coupling.

Frequently, a turbine will be used to drive a compressor, or a first compressor, which is being driven by a turbine, will be used to drive a second compressor. Typically, units such as turbines and compressors include a casing or shell enclosing the working parts of the unit, and a rotatable shaft extending outward from the casing. In order to use one of the units to drive a second unit, the shaft of the driving unit is connected, by means of a shaft coupling, to the shaft of the driven unit wherein rotation of the former shaft rotates the latter shaft. When a first compressor drives a second compressor, often vapor will be passed from the driving compressor to the driven compressor for further compression. In this case, the portions of the shafts which extend out from the casings and the shaft coupling which connects these shafts may be housed or covered by a shaft coupling housing which guides vapor from the first compressor to the second compressor.

Prior art housings for shaft couplings typically include a sleeve type member and an axially split housing member. To form the housing, the sleeve member is positioned around a first shaft before the shafts are coupled, and the sleeve member is connected to a first shaft casing. The sleeve only partially covers the shaft, leaving room to insert a coupling member between the shafts. Once the shafts are coupled, the axially split housing member, which includes a top section and a bottom section, is used to enclose the shafts and the shaft coupling. More specifically, the bottom section of the housing member is positioned below the shafts and shaft coupling, the top section is positioned above the shafts and shaft coupling, and the two sections are joined together, usually by bolting the sections together.

The axially split housing member often has a substantial axial length. This is generally the case because the area which the housing member covers must be large enough so that there is sufficient room to insert a coupling member into the area and to join the coupling to the individual shafts. Because of this relatively large axial length, a relatively large number of securing devices such as bolts are usually needed to tightly join the top and bottom sections of the housing member. These securing devices represent an expense. Further, because of the large number of securing devices involved, assembly and disassembly of the housing member, for example to replace or repair the shaft coupling, are relatively cumbersome and time consuming tasks, involving a considerable amount of expensive manual labor.

SUMMARY OF THE INVENTION

An object of this invention is to improve apparatus for housing shaft couplings.

Another object of the present invention is to provide a housing for a shaft coupling which allows easy access to the shaft coupling.

A further object of this invention is to slide one member of a shaft coupling housing into the interior of a second member of the housing to provide access to the shaft coupling.

A still further object of the present invention is to provide an improved apparatus for housing shaft couplings which can be used with many existing shaft couplings and shaft casings.

These and other objectives are attained with apparatus for housing a shaft coupling, comprising an outside axially extending cover for connection to a first shaft casing, and for partially covering a pair of generally aligned shafts and a shaft coupling connecting the shafts; and an inside axially extending cover for connection to a second shaft casing, and for further covering the shafts and the shaft coupling, wherein the inside cover is radially spaced from the outside cover and is axially slidable into the interior of the outside cover to produce an annular opening for access to the shafts and shaft coupling. The apparatus further comprises radial sealing means for sealing the space between the inside and outside covers.

A BRIEF DESCRIPTION OF THE DRAWINGS

A DETAILED DESCRIPTION OF THE PREFERRED EMBODIMENT

Figure 1:
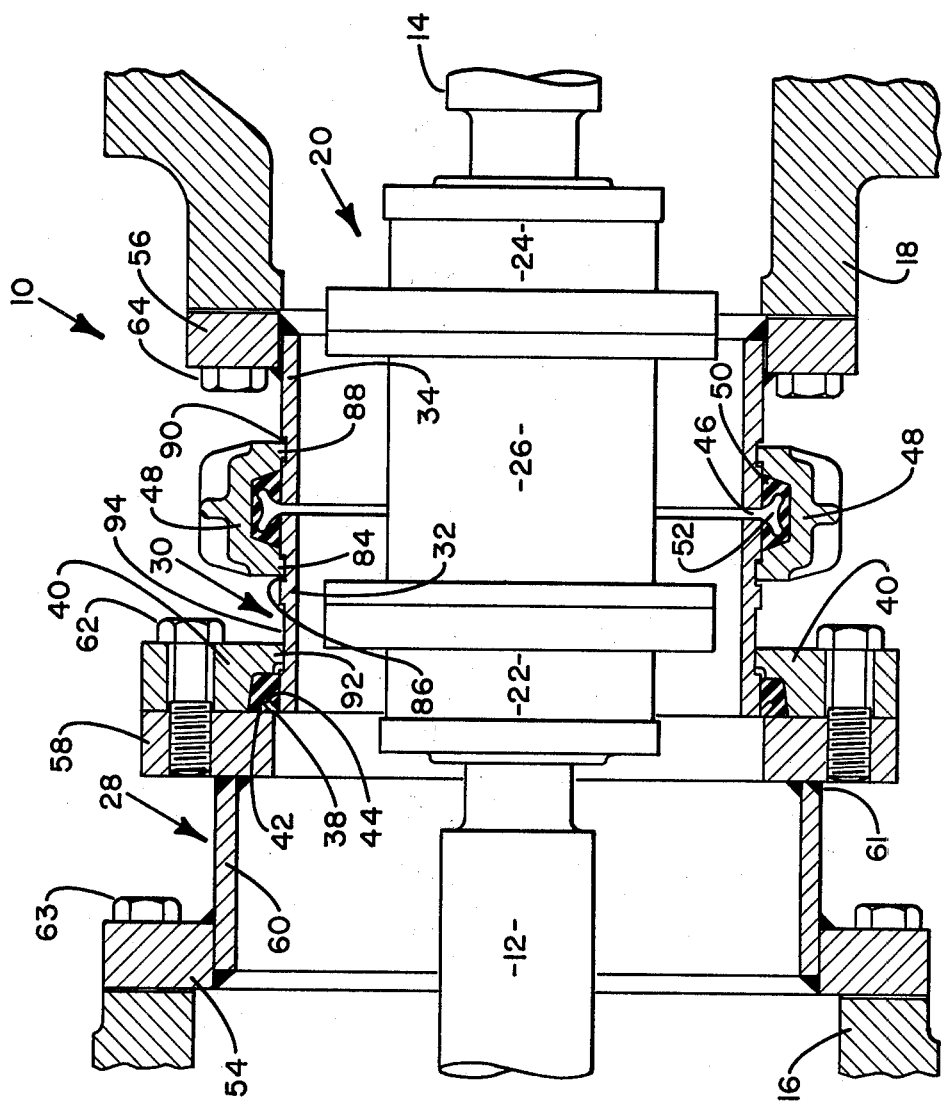
FIG. 1 is a side cross-sectional view of a shaft coupling housing constructed according to the present invention.

Referring to the drawings, FIG. 1 shows a cross-sectional view of apparatus 10 for housing a shaft coupling and constructed according to the present invention. There is also shown portions of a pair of generally aligned shafts 12 and 14, parts of shaft casings 16 and 18 wherein a shaft is associated with each casing and extends outward therefrom, and shaft coupling 20 for connecting shafts 12 and 14. One of shafts 12 and 14 drives the other shaft via coupling 20. For example, shaft 12 may be a turbine shaft used to drive shaft 14 which may be a compressor shaft. Or both shafts may be compressor shafts wherein shaft 12, which may be driven by a turbine not shown in the drawings, drives shaft 14. In both of the above situations, shaft 12 is referred to as the driving shaft while shaft 14 is referred to as the driven shaft. Coupling 20 connects shafts 12 and 14 so that one shaft drives the other. More particularly, as illustrated in FIG. 1, shaft coupling 20 includes first end section 22, second end section 24, and middle or coupling section 26. First end section 22 is directly connected to shaft 12, second end section 24 is directly connected to shaft 14, and middle section 26 is connected to both the first and second end sections so that rotation of one of shafts 12 and 14 produces rotation of the other shaft. As is well known in the art, coupling 20 may allow for slight axial misalignment between shafts 12 and 14 and may have other features such as torsional or axial flexibility. Numerous types of shaft couplings are well known in the art, and any of many suitable types may be used with the present invention.

Apparatus 10 comprises first or outside axially extending cover such as sleeve 28 for partially covering shafts 12 and 14 and shaft coupling 20, and second or inside axially extending cover such as sleeve 30 for further covering the shafts and the shaft coupling. Advantageously, a selected one of sleeves 28 and 30, preferably inside sleeve 30, includes first annular member 32 and second annular member 34. Annular members 32 and 34, discussed further below, are separable from each other and, as shown in FIG. 1, are spaced from each other. In addition, sleeve 30 is radially spaced from sleeve 28 and is telescopically or axially slidable into sleeve 28 to produce annular opening 36 (shown only in FIG. 2) for access to shafts 12 and 14 and shaft coupling 20. The radial between sleeves 28 and 30 is referenced as 38 in the drawings. Apparatus 10 further comprises radial or face sealing means 40 for sealing the space between the inside and outside sleeves.

In the embodiment depicted in the drawings, radial seal 40 includes annular gasket 42 in communication with sleeves 28 and 30 and radial spaced 38 for preventing high pressure vapor from escaping outward from the interior of apparatus 10 via radial space 38. Gasket 42 defines annular opening 44 in communication with radial space 38. As vapor pressure within apparatus 10 increases, the vapor pressure in opening 44 also increases. The increased vapor pressure in opening 44 tends to expand gasket 42, causing a tighter fit and seal between the gasket and sleeves 28 and 30. Thus, as the vapor pressure within apparatus 10 increases, a tighter seal develops between outside and inside sleeves 28 and 30.

As mentioned above, preferably inside sleeve 30 includes first and second annular members 32 and 34. These annular members are separable from each other to facilitate covering shafts 12 and 14. In the illustrated embodiment, annular members 32 and 34 have substantially equal radii, and the annular members have approximately equal axial length. Further, annular members 32 and 34 are axially spaced from each other to allow relative movement therebetween due to, for example, thermal expansion, and the axial space (shown only in FIG. 1) between the annular members is referenced as 46 in the drawings. With this arrangement, apparatus 10 further comprises axial seal 48 for sealing the axial space between annular members 32 and 34. In the embodiment depicted in the drawings, axial seal 48 includes annular gasket 50 in communication with first annular member 32, second annular member 34, and axial space 46 for preventing high pressure vapor from escaping outward from the interior of apparatus 10 via axial space 46. Gasket 50 defines annular opening 52 in communication with axial space 46. As vapor pressure within apparatus 10 increases, the vapor pressure in opening 52 also increases. The increased vapor pressure in opening 52 tends to expand gasket 50, causing a tighter fit and seal to develop between the gasket and first and second annular members 32 and 34. Thus, as the vapor pressure within apparatus 10 increases, a tighter seal develops between first and second annular members 32 and 34 to seal space 46 therebetween.

In the illustrated embodiment, outside sleeve 28 includes first annular flange 54 for connection to first shaft casing 16, and inside sleeve 30 includes second annular flange 56 for connection to second shaft casing 18. Moreover, a selected one of sleeves 28 and 30, preferably outside sleeve 28, include third annular flange 58 spaced from first and second annular flanges 54 ad 56, wherein radial seal 40 is connected to the third annular flange. With this preferred arrangement, outside sleeve 28 further includes axial spacing member 60 having a first end joined to first annular flange 54 by welding or the like so that a vapor tight joint is developed therebetween, and a second end joined to third annular flange 58 again by welding or the like so that a vapor tight joint is developed therebetween. The second end of axial spacing member 60 may be chamferred at 61 so that this end may be securely welded to third annular flange 58 in a manner not restricting axial movement of bolts 62, which connect radial seal 40 to the third annular flange. Also, second annular flange 56 is connected to second annular member 34 by welding or the like so that a vapor tight joint is developed therebetween.

Figure 2:
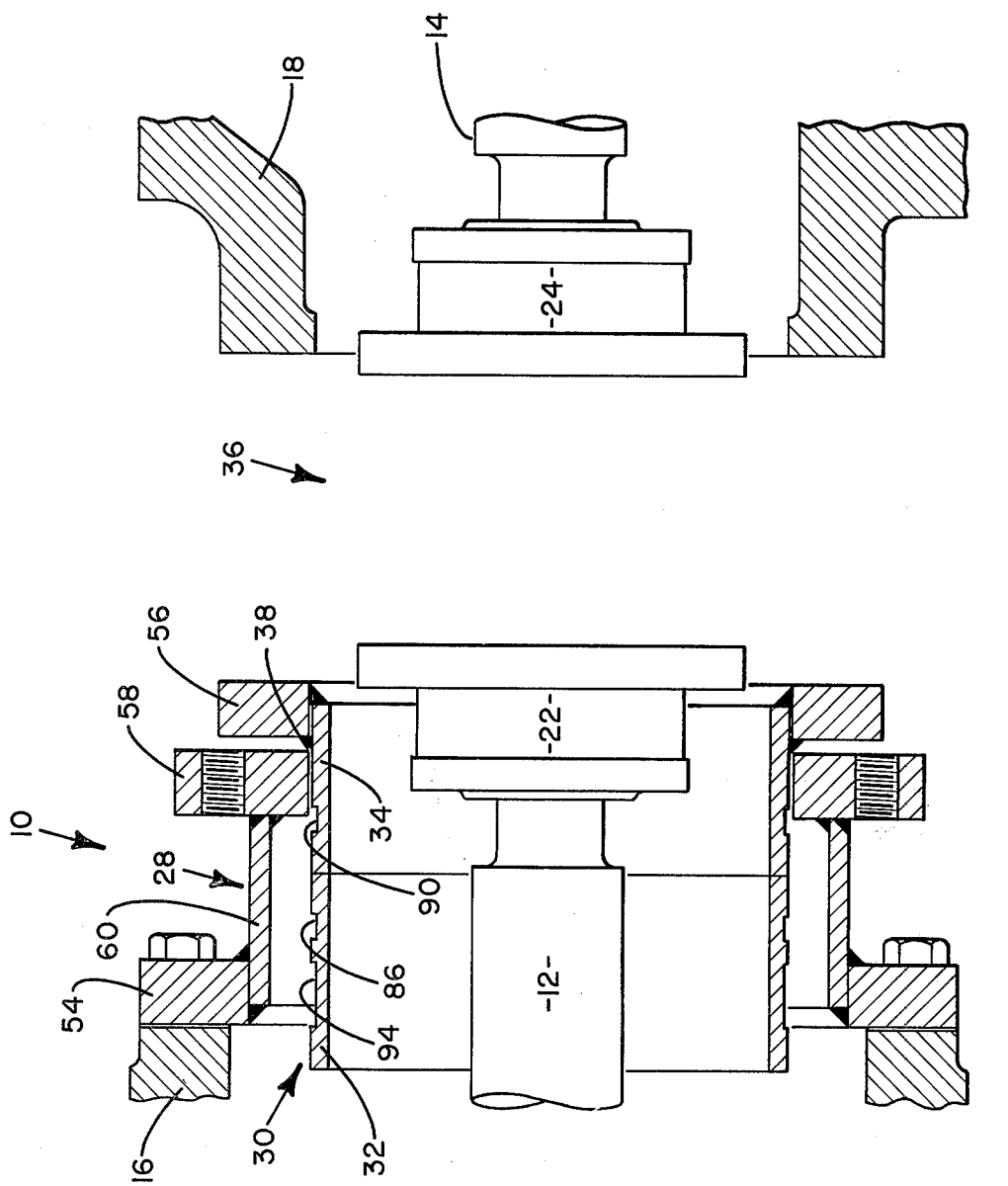
FIG. 2 is a view similar to FIG. 1, but with an inside sleeve member of the housing shown inside the interior of an outside sleeve member of the housing.
Figure 3:
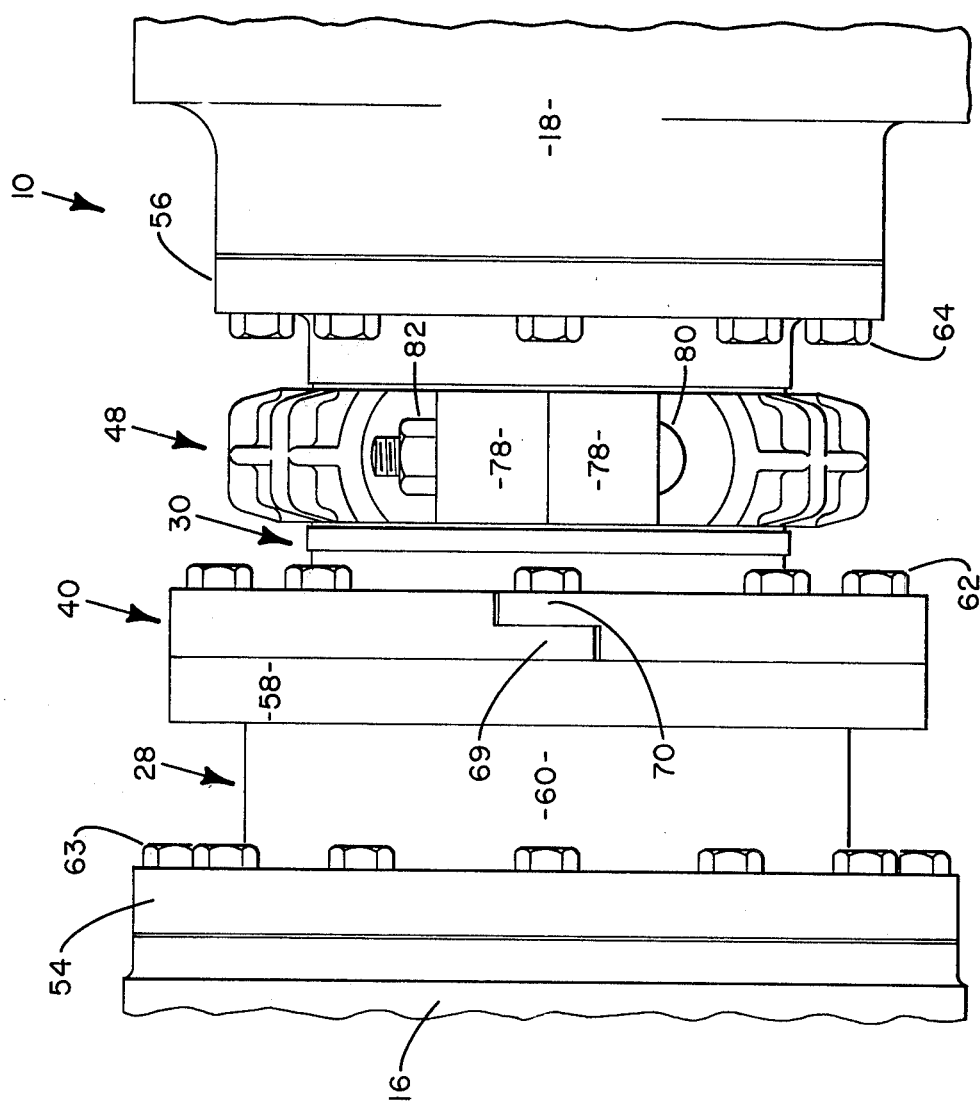
FIG. 3 is a side view of the shaft coupling housing shown in FIG. 1.

To house shaft coupling 20 within apparatus 10, shafts 12 and 14 are brought into general axial alignment as shown in the FIGS. 1 through 3. First end section 22 of shaft coupling 20 is secured to shaft 12, and second end section 24 of the shaft coupling is secured to shaft 14. End sections 22 and 24 of shaft coupling 20 may be connected to shafts 12 and 14 in any of many well known ways, for example by pins, screws, or bolts. Shafts 12 and 14 are partially covered by positioning first or outside sleeve 28 around one of the shafts. Preferably, outside sleeve 28 is moved along the axis of shafts 12 and 14 to the left as viewed in the drawings, until first annular flange 54 comes into abutting contact with first shaft casing 16. Flange 54 is secured to casing 16 by a plurality of securing means such as bolts 63. Preferably, an annular gasket (not shown) is located between shaft casing 16 and outside sleeve 28 for preventing vapor from passing therebetween. Shafts 12 and 14 are further covered by positioning second or inside sleeve 30 around one of the shafts, more particularly, annular members 32 and 34 are positioned around one of the shafts. Inside sleeve 30 is radially spaced from outside sleeve 28, and annular opening 36 is produced for access to shafts 12 and 14 by sliding the second or inside sleeve into the interior of the first or outside sleeve. This position of shafts 12 and 14 and sleeves 28 and 30 is shown in FIG. 2. Annular opening 36 provides access to shafts 12 and 14, and middle section 26 of shaft coupling 20 is passed through the annular opening and then secured to both end sections 22 and 24 to couple to shafts. Numerous ways of connecting middle section 26 to end sections 22 and 24 will be apparent to one skilled in the art, for example the sections could be joined by bolts, pins, screws or the like.

With the above described method, the axial distance between end sections 22 and 24 of shaft coupling 20 limits the axial length of any individual item which can be fitted around shafts 12 and 14. In the preferred embodiment of the present invention, wherein a selected sleeve is comprised of separable annular members 32 and 34, one annular member at a time can be fitted over a shaft. In this manner, the axial length of the selected sleeve and, hence, the axial length of annular opening 36 can be appreciably greater than the distance between end sections 22 and 24. This substantially facilitates inserting middle section 26 into opening 36 and securing the middle section to end sections 22 and 24. Once shafts 12 and 14 are coupled, annular opening 36 is closed by sliding inside sleeve 30 out of the interior of outside sleeve 28. That is, inside sleeve 30 is moved along the axis of shafts 12 and 14 to the right as viewed in the drawings, until annular flange 56 comes into abutting contact with second shaft casing 18. Flange 56 is secured to second shaft casing 18 by a plurality of securing means such as bolts 64, and preferably an annular gasket (not shown) is positioned between the second shaft casing and inside sleeve 30 for preventing vapor from passing therebetween.

Figure 4:
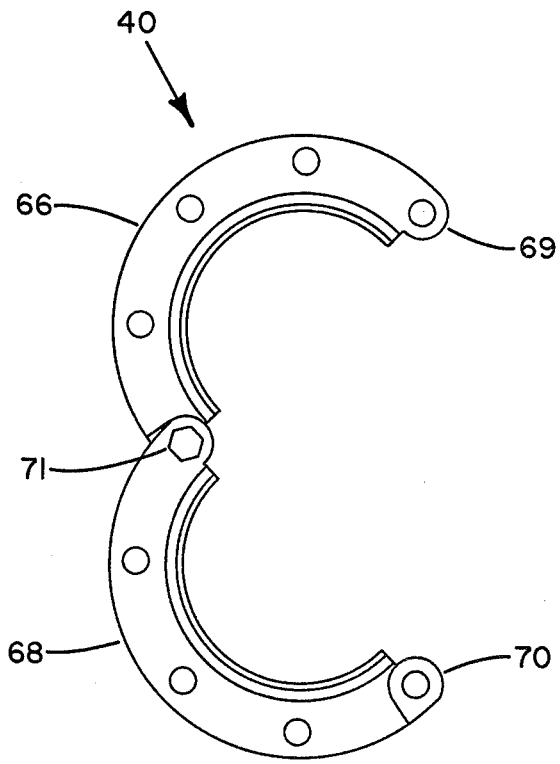
FIG. 4 is a front view of the first sealing means of the housing shown in FIGS. 1 through 3.

The step of closing annular opening 36 further includes the step of sealing radial space 38 between inside and outside sleeves 30 and 28 by means of radial seal 40. Referring particularly to FIG. 4, preferably radial seal 40 includes top half 66 and bottom half 68. Each half 66 and 68 generally comprises a half circle and includes an extended portion 69 and 70. The halves 66 and 68 are pivotally or hingedly connected to each other at 71, and the halves can pivot between a closed position, shown in FIG. 3, and an open position, shown in FIG. 4. In the open position, extended portions 69 and 70 are spaced from each other and radial seal 40 can be positioned so as to partially encircle inside sleeve 30. The halves 66 and 68 are then moved to the closed position wherein extended portions 69 and 70 overlap each other. When top half 66 and bottom half 68 are in this position, shown in FIG. 3, radial seal 40 completely encircles and is in contact with inside sleeve 30. Further, radial seal 40 is positioned adjacent third annular flange 68 and secured thereto by means such as bolts 62.

Figure 5:
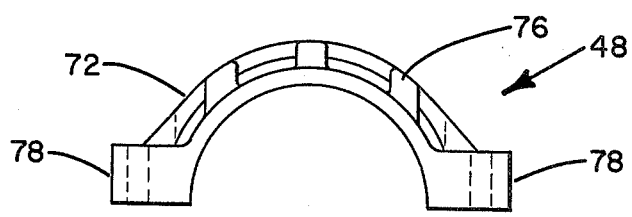
FIG. 5 is a front view of a second sealing means of the housing shown in FIGS. 1 through 3.
Figure 5:
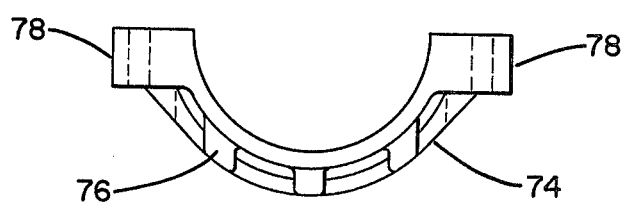

As mentioned above, preferably a selected one of sleeves 28 and 30 includes first annular member 32 and second annular member 34 which is axially spaced from the first annular member. With this arrangement, the step of closing annular opening 36 further includes the step of sealing axial space 46 between annular members 32 and 34. Space 46 is sealed by means of axial seal 48. Referring particularly to FIG. 5, preferably seal 48 includes top half 72 and bottom half 74. Each half 72 and 74 generally comprises a half circle and includes a plurality of reinforcing flanges 76. Each half 72 and 74 further includes a pair of end flanges 78. To seal axial space 46, top half 72 of axial seal 48 and bottom half 74 are positioned around inside sleeve 30 to form an annular cover or seal for the axial space, and the top and bottom halves 72 and 74 are secured together by means such as bolts 80 and nuts 82 (only one of each nut and bolt is shown in FIG. 3).

As discussed above, prior art coupling housings generally require an axially split housing member. The present invention, as described above, is effective to eliminate the need for such an axially split housing member. Hence, the present invention eliminates the need for the relatively large number of securing devices required to join the top and bottom portions of the axially split housing member so as to form a good, tight seal therebetween. This, of course, reduces the cost of manufacturing the shaft coupling housing and, perhaps more importantly, significantly facilitates assembly and complete and partial disassembly of the housing—tasks which heretofore have usually required a considerable amount of costly manual labor. In addition, as may be appreciated by one skilled in the art, the present invention does not require that the shaft casings and shaft coupling, with which the invention is to be used, have any unique or special feature. In contrast, the present invention may readily be used with numerous, already existing shaft couplings and casings, making the present invention well-suited for use on a retrofit basis.

During the course of operation, apparatus 10 may be subjected to relatively high temperatures, causing axial expansion of or relative movement between various members of the apparatus. In light of this, axial seal 48 includes first annulus 84, and the exterior surface of first annular member 32 defines first annular groove 86 having an axial length greater than the axial length of the first annulus, wherein the first annulus extends into the first annular groove for allowing limited relative axial movement between the first annular member and the axial seal. Also, axial seal 48 includes second annulus 88, and the exterior of second annular member 34 defines second annular groove 90 having an axial length greater than the axial length of the second annulus, wherein the second annulus extends into the second annular groove for allowing limited relative axial movement between the second annular member and the axial seal. Similarly, radial seal 36 includes third annulus 92, and the exterior surface of a selected one of sleeves 28 and 30, preferably inside sleeve 30, defines third annular groove 94 having an axial length greater than the axial length of the third annulus, wherein the third annulus extends into the third annular groove for allowing limited relative axial movement between the selected sleeve and the radial seal. Above-described annuli 84, 88 and 92 and above-described grooves 86, 90 and 94 also assist in properly positioning and aligning sealing members 40 and 48 relative to annular members 32 and 34.

While it is apparent that the invention herein disclosed is will calculated to fulfull the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. Apparatus for housing a shaft coupling comprising:
    an outside axially extending cover for connection to a first shaft casing, and for partially covering a pair of generally aligned shafts and a shaft coupling connecting the shafts;
    an inside axially extending cover for connection to a second shaft casing, and for further covering the shafts and the shaft coupling, where the inside cover is radially spaced from and axially slidable into the interior of the outside cover to produce an annular opening for access to the shafts and shaft coupling;
    a selected one of the covers including a first annular member and a second annular member axially spaced and separable from the first annular member to facilitate covering the shafts;
    a radial seal for sealing the radial space between the inside and outside covers; and
    an axial seal for sealing the axial space between the first and second annular members.

2. The apparatus as defined by claim 1 wherein:
    the axial seal includes a first and second annulus;
    the surface of the first annular member defines a first annular groove having an axial length greater than the axial length of the first annulus, wherein the first annulus extends into the first annular groove for allowing limited relative movement between the first annular member and the axial seal;
    the surface of the second annular member defines a second annular groove having an axial length greater than the axial length of the second annulus, wherein the second annulus extends into the second annular groove for allowing limited relative movement between the second annular member and the axial seal;
    the radial seal includes a third annulus; and the surface of a selected one of the covers defines a third annular groove having an axial length greater than the axial length of the third annulus, wherein the third annulus extends into the third annular groove for allowing limited relative movement between the radial seal and the selected cover.

3. The apparatus as defined by claim 2 wherein:

the outside cover includes a first annular flange for connection to the first shaft casing;

the inside cover includes a second annular flange for connection to the second shaft casing; and a selected one of the covers includes a third annular flange spaced from the first and second annular flanges, wherein the radial seal is connected to the third annular flange.

* * * * *